United States Patent
Pyle et al.

(10) Patent No.: US 7,068,306 B2
(45) Date of Patent: Jun. 27, 2006

(54) PROXY-BASED REMOTE CONTROL METHOD AND SYSTEM FOR A DIGITAL CAMERA

(75) Inventors: Norman C. Pyle, Greeley, CO (US); Mark J. Bianchi, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 10/037,759

(22) Filed: Jan. 2, 2002

(65) Prior Publication Data

US 2003/0122936 A1    Jul. 3, 2003

(51) Int. Cl.
*H04N 5/232*    (2006.01)
*G08G 1/123*    (2006.01)
*H04N 5/225*    (2006.01)

(52) U.S. Cl. ............... 348/211.9; 340/996; 348/207.11

(58) Field of Classification Search ........... 348/211.99, 348/143, 207.1, 211.2, 211.1, 207.11, 211.9; 370/257; 725/105; 340/996
See application file for complete search history.

(56) References Cited

U.S. PATENT DOCUMENTS

| | | | | |
|---|---|---|---|---|
| 6,400,903 B1 * | 6/2002 | Conoval | ....................... | 396/56 |
| 6,615,293 B1 * | 9/2003 | Shima et al. | ................. | 710/30 |
| 6,889,191 B1 * | 5/2005 | Rodriguez et al. | .......... | 704/275 |
| 2003/0117499 A1 * | 6/2003 | Bianchi et al. | .......... | 348/211.2 |

* cited by examiner

*Primary Examiner*—Lin Ye (57) ABSTRACT

Method and system for enabling an image capture system to respond to at least one command transmitted by a foreign remote control that is associated with a first device. The image capture system is first trained to respond to at least one command that is received from the foreign remote control. A user can then use the foreign remote control to access at least one function of the trained image capture system. For example, the foreign remote control can be used to access a first predefined function of the image capture system by transmitting a first instruction to the image capture system. The image capture system, responsive to the first instruction, performs the first predefined function.

15 Claims, 4 Drawing Sheets

PROXY-BASED REMOTE CONTROL METHOD AND SYSTEM FOR A DIGITAL CAMERA

FIELD OF THE INVENTION

The present invention relates generally to digital cameras, and more particularly, to a method and system for remotely controlling a digital camera by proxy.

BACKGROUND OF THE INVENTION

We are in the midst of a digital photography revolution, where everyday more and more users are embracing digital cameras instead of the traditional film-based camera. There are many reasons why users have made the switch from traditional cameras to digital cameras. One reason is that digital cameras provide features that are unavailable with traditional cameras. Some benefits of digital cameras over traditional cameras include 1) instant gratification, 2) ease of sharing the pictures, and 3) PC-based digital darkroom capabilities.

First, a user receives instant feedback from a digital camera. For example, a user can view the pictures the moment that he/she shoots them. The user can then select the best pictures and delete the unwanted pictures without wasting money on developing film and printing photos that are of little or no value to the photographer.

Another benefit of digital cameras is that they facilitate the creation and sharing of digital memories. Since the digital photographs are already in electronic form, a user can readily share the pictures with others. For example, a user can electronically mail the pictures to friends and family or post the pictures to a web site so that others can view them. As electronic mail (e-mail) and the Internet have allowed people to share information with anyone in the world, digital photography enables people to make an instant visual connection.

For example, vacation memories may be shared with friends and family by creating a web site dedicated to the vacation. Photos of the new baby can be electronically mailed to friends and family. Digital pictures also provide the opportunity to have "instant" pictures of special occasions. For example, in an anniversary party for one's parents, one can take pictures of the event and then immediately print photos to send to guests the day after. Alternatively, one can even print the photos before the guests leave the special occasion.

Digital technology gives the user the opportunity to be a darkroom developer without the darkness and chemicals required by traditional film. A personal computer (PC) and a digital-imaging program provide a PC-based digital darkroom that enables a user to be a darkroom developer. Digital pictures are especially amenable to modification and manipulation in a digital darkroom.

The magic begins once a digital picture is loaded into a user's computer. A user can easily crop the photos to focus in on a subject. A user can also make flaws (e.g., eyes that appear to be red) in the picture magically disappear or remove a distracting object from the background. Furthermore, a user can cut and paste portions of a first picture into a second picture to create special effects. Once the user has the picture the way that the user wants, the user simply prints the picture.

As the popularity of digital cameras grows, manufacturers of digital cameras are constantly striving to improve the camera design and user interface design and to add features that are offered by the camera. Mechanisms and features that makes the camera easier to use or that provides features that are useful to the photographer are in demand.

An important design consideration in digital cameras is how to allow users to view and share the pictures before the pictures are downloaded to a personal computer (PC). For example, when pictures are stored in the cameras, many digital still cameras (DSCs) provide a display that is mounted to the back of the cameras for viewing the captured images. Unfortunately, these displays are small and often have limited viewing angles. Consequently, the user must hand the camera to each person who wishes to view the image. In this regard, it is difficult to discuss certain aspects of an image since all parties cannot view the image simultaneously. Also, the process of passing the camera around a room of people is cumbersome and inefficient.

In order to solve this problem, many current digital still cameras have an audio/video (A/V) output connector that is designed to connect to a television (TV) through a cable. The cable allows a user to review pictures on the TV screen, which is much larger than the small display on the camera. The use of a TV screen is certainly more convenient than having to pass the camera around the room for picture viewing purposes.

One disadvantage of this approach is that it requires the user to remain tethered to the TV through the A/V cable in order to access user interface functions through manipulation of the switches and buttons on the camera. Typical user interface functions include scrolling through still or video images, deleting unwanted pictures, zooming in and zooming out of a particular region of interest in the picture.

Difficulty of accessing the A/V connectors of the TV is another disadvantage of this approach. Before a viewing session, a user must connect the A/V cable to the A/V connectors of the TV, which are often in a hard-to-access location in the back of the TV. Access is required both before and after the viewing session to connect and disconnect the A/V cable, respectively. As can be appreciated, this requirement places an annoying burden on the user.

Another problem is the need for long A/V cables to enable a user who is controlling the camera functions to be far enough away from the TV to have an adequate view of the TV. These long cables are an added cost to the user and may also pose a safety hazard (e.g., a trip hazard).

Some manufacturers of digital cameras have designed remote controls that are specifically designed for controlling their cameras. Although the remote control solves the problems inherent in using an A/V cable, the provision of a dedicated remote control increases the costs of the camera package. Furthermore, there is a burden on the user to learn the specific commands of a new and unfamiliar remote control. Also, since it is common to have multiple remote controls for controlling different electronic equipment near the TV, the addition of yet another remote control does not simplify the clutter of remote controls near the TV.

Consequently, it would be desirable for there to be a mechanism to train a digital camera to respond to commands of an existing remote control that is foreign to the camera and associated with another device.

Based on the foregoing, there remains a need for a proxy-based remote control method and system for a digital camera that overcomes the disadvantages set forth previously.

SUMMARY OF THE INVENTION

According to one embodiment of the present invention, a remote control method and system for a digital image capture device (e.g., a digital camera) that trains an image capture system to recognize commands from a standard remote control, thereby enabling the remote control to be used to access one or more functions of the image capture system, are described.

Another aspect of the present invention is the provision of a proxy-based remote control mechanism that avoids the inconvenience of a wired form of control (e.g., by using a cable that is tethered to an image capture system, which may be a safety hazard).

Another aspect of the present invention is the provision of a remote-control system that utilizes a standard remote control.

Another aspect of the present invention is the provision of a proxy-based remote control mechanism that relieves the camera manufacturer from having to design and to build a unique remote control for the camera, thereby reducing the costs of the digital camera.

Another aspect of the present invention is the provision of a proxy-based remote control mechanism that can be trained to respond to commands transmitted by a remote control that belongs to another device. The remote control may belong to a commonly found device (e.g., a remote control for a VCR) that is familiar to the user.

According to one embodiment, a method for enabling an image capture system to respond to at least one command transmitted by a foreign remote control, which is associated with a first device, is described. The image capture system is first trained to respond to at least one command that is received from the foreign remote control. A user can then use the foreign remote control to access at least one function of the trained image capture system. For example, the foreign remote control can be used to access a first predefined function of the image capture system by transmitting a first instruction to the image capture system. The image capture system, responsive to the first instruction, performs the first predefined function.

According to another embodiment of the present invention, an image capture system is described. The image capture system includes a first function that is accessible by a user. The image capture system also includes a proxy-based remote control mechanism. During training mode, the proxy-based remote control mechanism receives commands from a foreign remote control, associates at least one received command with the first function of the image capture system, and stores the association between the received command and the first function in an association table.

During operation, the proxy-based remote control mechanism receives commands from the foreign remote control, decodes the received commands by employing the association table, and allows the foreign remote control to access the function of the image capture system corresponding to the decoded command.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A proxy-based remote control method and system for an image capture system (e.g., a digital camera) are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100 That Employs a Proxy-Based Remote Control

Figure 1:
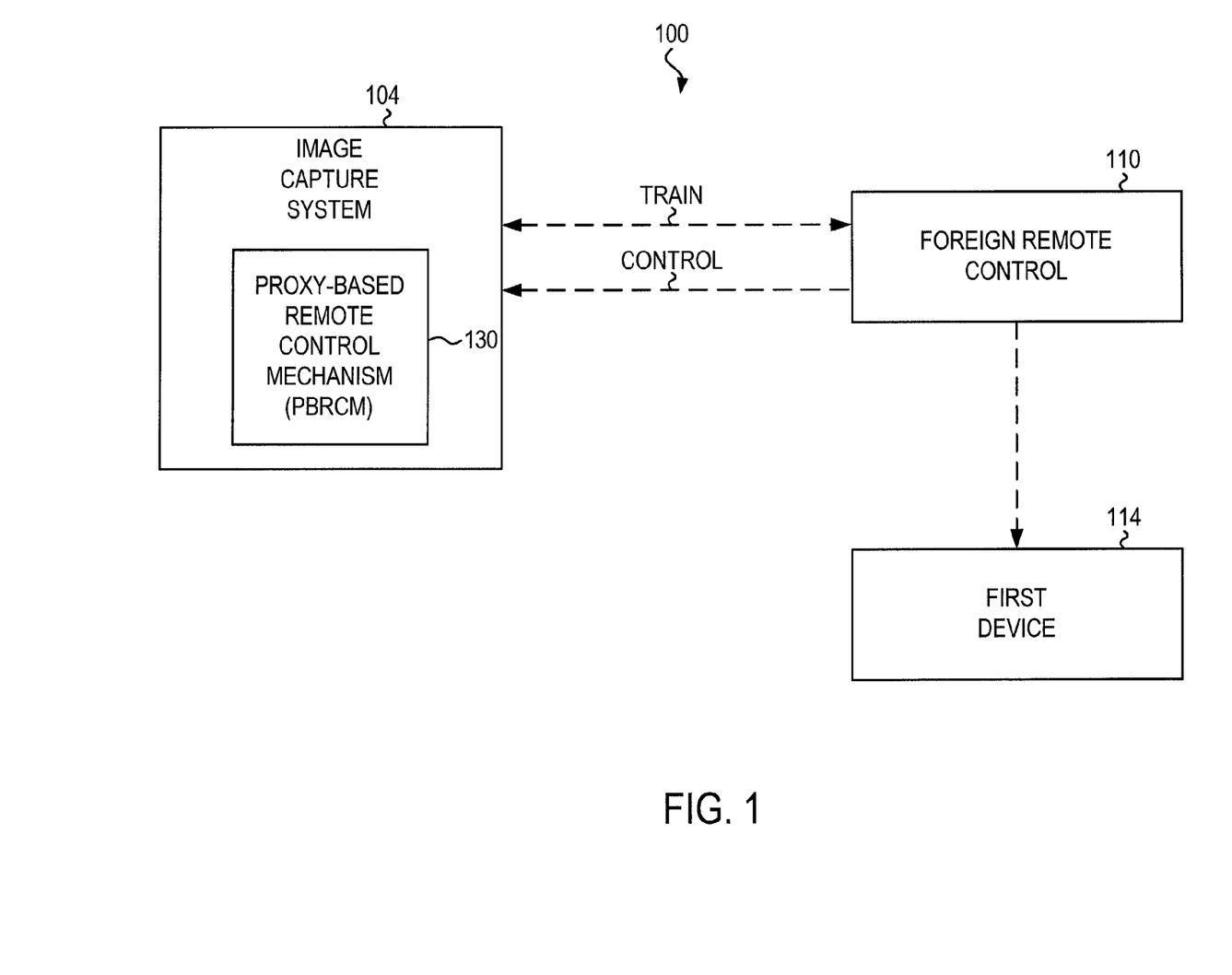
FIG. 1 illustrates a system that employs a proxy-based remote control mechanism according to one embodiment of the present invention.

FIG. 1 illustrates a system 100 that employs a proxy-based remote control mechanism (PBRCM) 130 according to one embodiment of the present invention. The system 100 includes an image capture system 104, which can be, for example, a digital camera, a docking station for a digital camera, or a combination thereof.

The image capture system 104 has one or more features or functions that may be controlled by a user. These functions include, but are not limited to, scrolling through still or video images, deleting unwanted pictures, zooming in and zooming out of a particular region of interest in the picture, and slide-show features. The proxy-based remote control mechanism (PBRCM) 130 of the present invention enables a user to remotely access one or more of these functions or features with a foreign remote control 110.

For example, when the image capture system 104 is a digital camera, the camera can include a LCD screen for displaying the pictures and also for displaying a graphical user interface (GUI). The graphical user interface allows a user to configure the camera or otherwise select options for display by using one or more switches or buttons on the camera. Often, the digital camera includes a menu button, a select button, and a navigation button having an up arrow, left arrow, right arrow, and down arrow. The proxy-based remote control method and system of the present invention can be utilized to learn from a foreign remote control with remote control commands that can replace the function of one or more of the switches or buttons on the camera.

The system 100 also includes a foreign remote control 110 that is designed to control or is associated with a first device 114 (e.g., a VCR player or DVD player). The foreign remote control 110 is not designed specifically for use with the image capture system 104 (i.e., the remote control 110 is "foreign" to the image capture system 104). The foreign remote control 110 includes a transmitter for transmitting commands. The foreign remote control 110 is preferably a remote control that is familiar to the user and that is commonly found in a user's home.

In this regard, the image capture system 104 is first trained to understand the commands of a foreign remote control 110 according to the teachings of the present invention and then a user can employ the foreign remote control 110 to remotely control the image capture system 104 and access one or more functions provided by the image capture system 104. The training procedure is described in greater detail hereinafter with reference to FIG. 3.

The image capture system 104 includes a proxy-based remote control mechanism (PBRCM) 130 for receiving commands from foreign remote controls (e.g., remote control 110) and associating the commands with a respective function or feature of the image capture system 104. The proxy-based remote control mechanism (PBRCM) 130 then stores these associations between the camera functions and different command sets. Once stored, the proxy-based remote control mechanism (PBRCM) 130 is able to respond to the different command sets of different remote controls. In summary, the proxy-based remote control mechanism (PBRCM) 130 enables foreign remote controls (e.g., remote control 110) to access one or more of the functions or features provided by the image capture system 104.

Remote Control Mechanism 130

Figure 2:
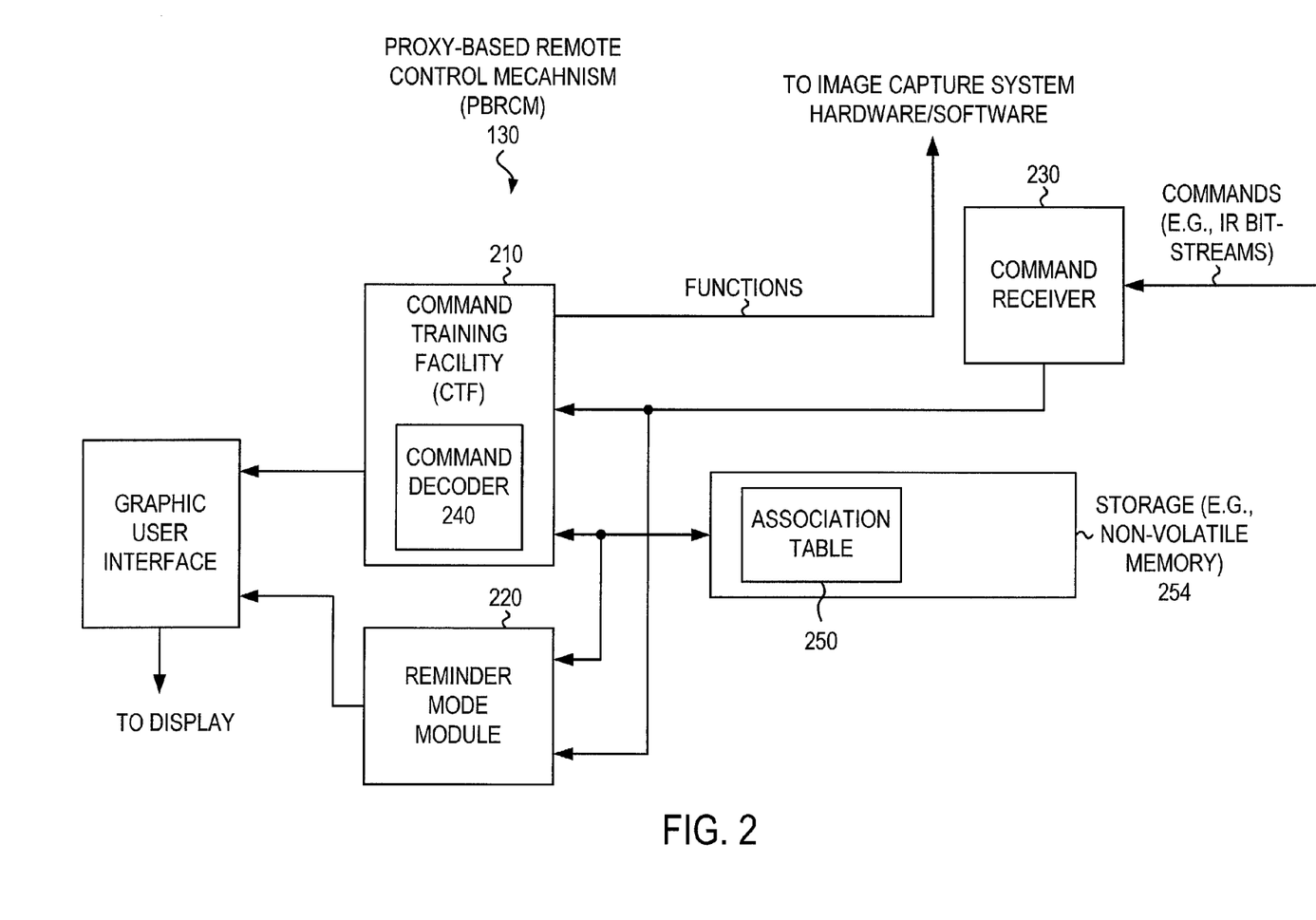
FIG. 2 is block diagram illustrating in greater detail the proxy-based remote control mechanism of FIG. 1 in accordance with one embodiment of the present invention.

FIG. 2 is block diagram illustrating in greater detail the remote control mechanism 130 of FIG. 1 in accordance with one embodiment of the present invention. The remote control mechanism 130 can include a command training facility (CTF) 210 for learning the commands of the foreign remote control 110 in order to enable the foreign remote control 110 to be used to access a function or otherwise control the image capture system 104. The processing steps performed by the command training facility (CTF) 210 in accordance with one embodiment of the present invention is described hereinafter with reference to FIG. 3.

The proxy-based remote control mechanism (PBRCM) 130 can also include a reminder mode module 220 for aiding a user in remembering a function for the image capture system 104 that is associated with a particular button on the foreign remote control 110. In the event a user forgets a function that is associated with a particular button on the remote control 110, the user can enter a reminder mode for assistance. The processing steps performed by the reminder mode module 220 in accordance with one embodiment of the present invention is described hereinafter with reference to FIG. 4.

The proxy-based remote control mechanism (PBRCM) 130 includes a command receiver 230 for receiving commands from the foreign remote control 110. In this example, the command receiver 230 is an infrared (IR) receiver for receiving IR bit streams transmitted by the foreign remote control 110. However, it is noted that other types of transmission medium, such as radio frequency (RF), may be utilized in lieu of the infrared (IR) medium.

The proxy-based remote control mechanism (PBRCM) 130 also includes a command decoder 240 that is coupled to the command receiver 230. The command decoder 240 decodes the received command and associates the command with a function of the image capture system 104 by employing an association table 250. The association table 250 associates a command (e.g., an IR bit stream) with a function of the image capture system 104. The association table 250 may be stored in a memory or storage 254 that is preferably a non-volatile memory. TABLE I illustrates exemplary content for an association table 250 that is utilized by the decoder 240. Once the command decoder 240 decodes a function from the received command, a function identifier (e.g., a signal) can be provided to activate other signals or program modules (e.g., hardware, software, firmware, or a combination thereof, that is resident in the image capture system) that implement the function.

The user first trains the image capture system 104 with the commands of the foreign remote control 110 and associates those commands with a respective feature of the image capture system 104. Once the image capture system 104 is trained to understand the commands from a foreign remote control 110, the foreign remote control 110 can be utilized to access the functions of the image capture system 104. As described previously, the remote control 110 can be, for example, a remote control for a video cassette recorder (VCR), a digital video disc (DVD) player, or other commonly found remote control that is familiar to the user.

Preferably, the proxy-based remote control mechanism (PBRCM) 130 is implemented as a program (e.g., software, firmware, or a combination thereof) that when executing on a processor (e.g., a micro-controller) provides a graphic user interface, receives commands (e.g., IR bit streams) from foreign remote controls, and associates the commands (e.g., IR bit streams) generated by the foreign remote control 110 with functions of the image capture system 104. In this manner, the proxy-based remote control mechanism 130 is trained to recognize and respond to the commands of the foreign remote control 110, thereby enabling a user to employ the foreign remote control 110 to access one or more functions or features of the image capture system 104.

TABLE I

| Stored Bit Stream_1 | Function_1 |
| Stored Bit Stream_2 | Function_2 |
| Stored Bit Stream_3 | Function_3 |
| Stored Bit Stream_4 | Function_4 |
| ... | ... |
| ... | ... |
| Stored Bit Stream_N | Function_N |

Training Mode Processing

Figure 3:
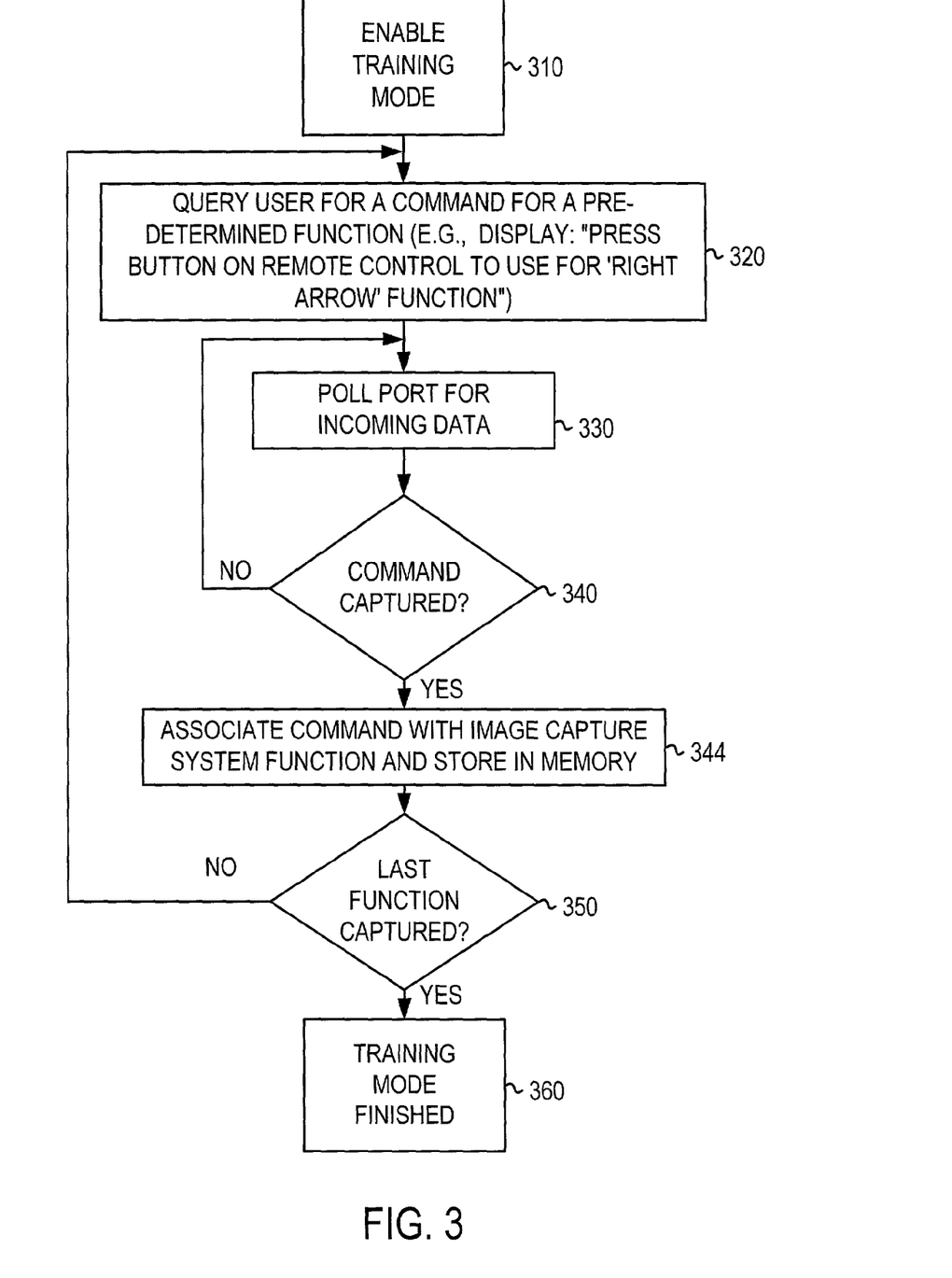
FIG. 3 is a flow chart illustrating the steps performed by the by the command training facility (CTF) of FIG. 2 in accordance with one embodiment of the present invention.

FIG. 3 is a flow chart illustrating the steps performed by the command training facility (CTF) 210 of FIG. 2 in accordance with one embodiment of the present invention. In step 310, the user enables the training mode by employing a button on the camera or by selecting an option in a graphical user interface (GUI). For example, a user can press a button to select the training mode or employ a graphical user interface to enable the training mode. In step 320, the user is queried for a predetermined function (e.g., a function that corresponds to a camera button function). For example, the following instruction can be displayed to the user: "Press Button on the Remote Control to use for 'Right Arrow' Function."

In step 330, the command receiver 230 is polled for incoming data. In decision block 340, a determination is made whether a command (e.g., an IR bit stream) has been captured. When a command has been captured, processing proceeds to processing step 344. Otherwise, when a command has not been captured, processing proceeds to processing step 330.

In step 344, the captured command is associated with a function of the image capture system, and the association between the command and the function is stored.

In decision block 350, a determination is made whether there are more image capture functions to be captured. When there are more image capture functions to be processed, the processing proceeds to processing step 320. Otherwise, when there are no more image capture functions (i.e., the last camera function has been captured), the training mode is completed (step 360).

It is noted that the user can re-enter the command training mode to re-program the image capture system 104 to use a new set of remote control buttons on the foreign remote control 110 or an entirely new foreign remote control.

Reminder Mode Processing

Figure 4:
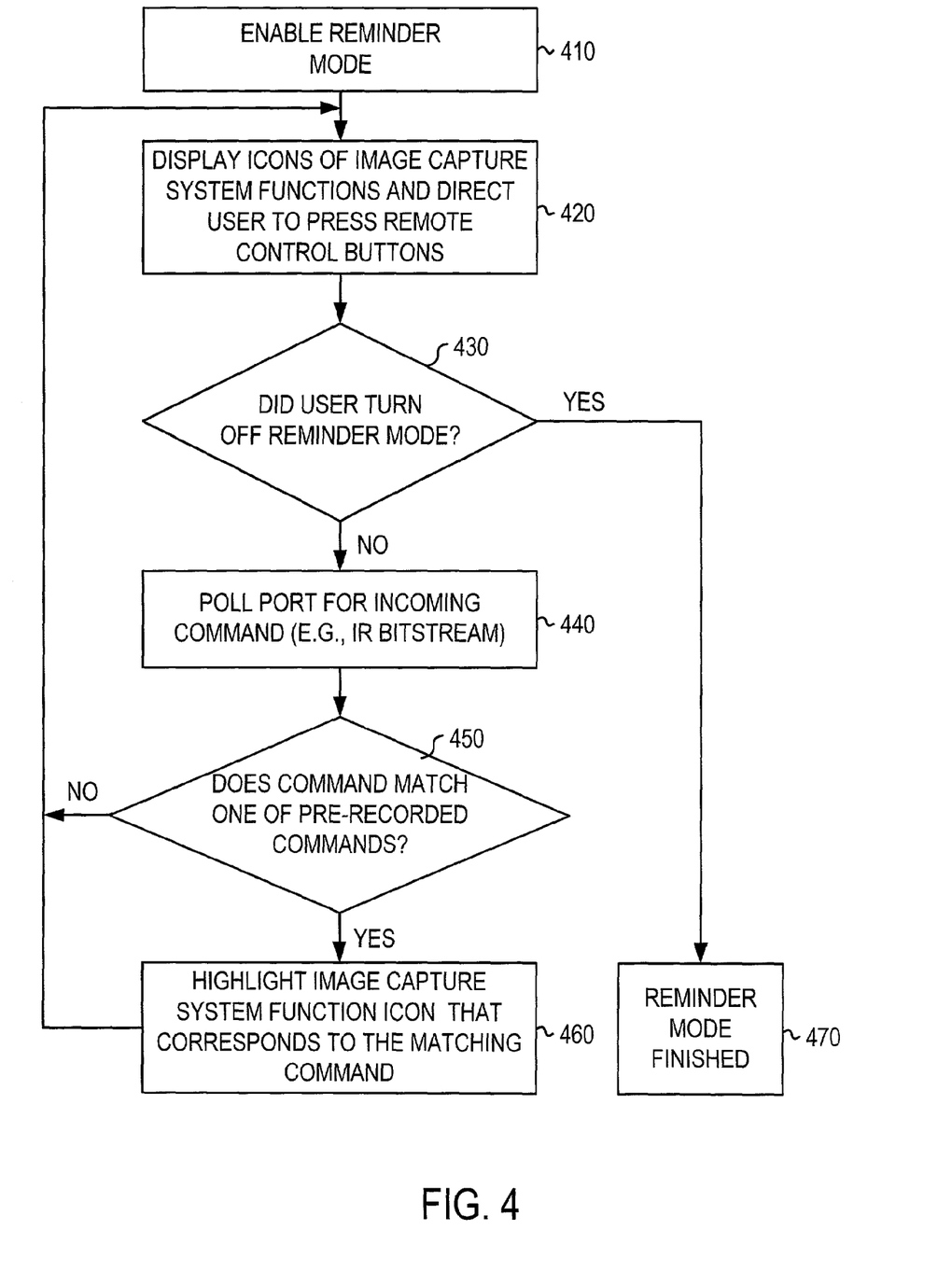
FIG. 4 is a flow chart illustrating the steps performed by the reminder mode module of FIG. 2 in accordance with one embodiment of the present invention.

FIG. 4 is a flow chart illustrating the steps performed by the reminder mode module of FIG. 2 in accordance with one embodiment of the present invention. In step 410, a user enables the reminder mode by pressing a button on the image capture system or selecting a reminder mode option provided by a graphical user interface (GUI). In step 420, icons of the functions of the image capture system (e.g., digital camera) are displayed, and a user is directed to press the remote control buttons. In decision block 430, a determination is made whether the user has turned off the reminder mode. When it is determined that the user has turned off the reminder mode, the reminder mode is exited (step 470). Otherwise, when it is determined that the user has not turned off the reminder mode, in step 440, the command receiver (e.g., an IR port) is polled for an incoming command (e.g., an IR data bit stream).

In decision block 450, a determination is made whether the received command matches one of the pre-recorded commands. When the received command matches one of the pre-recorded commands, in step 460, the icon for the image capture system function that corresponds to the matching command is highlighted in the display. Processing then continues at step 420.

Training Mode is preferably initiated by pressing one or more (e.g., a set of button) on the camera, rather than on a remote control. Reminder Mode is also preferably initiated by pressing one or more (e.g., a set of button) on the camera, rather than on a remote control. One reason for using the buttons on the camera is that there can be no reliable communication between the user, the remote control, and the camera until the device is recognized.

In one embodiment, an "Options" or "Preferences" menu is provided. A user can enter this menu by using the camera user interface (e.g., buttons) and select the desired mode in this manner. From that point forward, the remote control may be used for Training Mode or Reminder Mode.

Defining Proxies

Before the foreign remote control 110 (e.g., the VCR remote control) can be utilized, the image capture system 104 is first subject to a command training mode or session, where certain buttons on the foreign remote control 110 are assigned to predetermined functions of the image capture system. The proxy-based remote control mechanism of the present invention may be implemented in hardware, software, firmware or a combination thereof, that can be resident in the image capture system (e.g., a digital camera) to interact with a user and to aid the user in programming the image capture system 104 to understand commands from a foreign remote control 110 so that the foreign remote control 110 may be used to activate one or more functions (e.g., user interface (UI) functions) of the image capture system 104.

During the command training session, the image capture system 104 is trained to understand commands that are transmitted by the foreign remote control 110. For example, in the training mode, the image capture system 104 can query a user to "Press the button which will be used for the 'Right Arrow' function". In response, the user selects a particular button and presses that button. The foreign remote control 110 responsive to the pressed button then transmits a corresponding command. The image capture system 104 receives the command (e.g., a stream of IR light pulses) that corresponds to the pressed button. The image capture system 104 then assigns that stream of pulses to the 'Right Arrow' function, thereby associating the received command with a function of the image capture system 104. In this example, the string of light pulses transmitted by the foreign remote control 110 becomes a proxy for a pressed "Right Arrow" button on the image capture system 104.

During the command training mode or session, a user can be led through a set of instructions on a TV screen. These instructions, for example, instruct the user to select certain buttons on the VCR remote control to perform associated functions on the image capture system 104 (e.g., digital camera). The button on the VCR remote control then becomes a proxy for the camera button to perform a particular function of the camera. Specifically, the command (e.g., infrared bit stream produced by the VCR remote control) becomes a proxy for the camera button to perform a particular function within the user interface of the camera.

The number of buttons that needs to be learned can range from a single button to several buttons and depends on the complexity of the user interface of the image capture system 104. In one embodiment, a single button on the remote control 110 is programmed. In this embodiment, a single button is defined that can be, for example, associated with the user interface function of advancing to a next picture for viewing. This feature can be utilized to enable friends and family to view pictures (e.g., vacation slides).

In another alternative embodiment, multiple buttons on the remote control 110 are programmed. In this alternative embodiment, a more complex user interface may require navigation through menus. Such a user interface may require an up direction, a down direction, a right direction and a left direction, and an "OK" or "ENTER" function. In this case, a user may select the STOP, PAUSE, REWIND, FAST FORWARD, and ENTER buttons on the remote control to perform the respective functions. It is to be understood that the specific buttons designated for use to initiate functions and the specific functions to which each designated button on the foreign remote control 110 is assigned depend on the actual layout of the foreign remote control 110 (e.g., a VCR remote control) and user preference. For example, a particular layout or designation may depend on what is most comfortable for a user or on what buttons are easiest to use to navigate).

Once the proxies are defined and saved into the storage 254, the foreign remote control 110 (e.g., a VCR remote control) may be used at any time in the future to access the pre-defined camera functions. Preferably, the first device 114 (e.g., the VCR) is turned off during the use of the remote control 110 to access the functions of the image capture system 104. In this manner, the first device 114 (e.g., the VCR) is precluded from responding to commands that are intended for the image capture system 104 (e.g., camera). In this regard, it is preferable that the remote control for the display (e.g., the television remote control) not be used to access functions of the image capture system 104 since the display is on for the purpose of displaying the images or pictures.

Similarly, if other remote controls are utilized in lieu of the VCR remote control, it is preferable that the device, which the remote control normally controls, be turned off in order to prevent that device from responding to the commands (e.g., volume control, changing channels, changing modes, setup functions, etc.) that are intended for the image capture system 104.

The present invention includes the reminder mode module 220 for displaying on a display (e.g., a television) a user interface function in response to a selected button of the remote control. In this manner, if a user should forget which buttons on the remote control are associated with respective user interface functions, a user can utilize the reminder mode to quickly and efficiently determine a function of the image capture system 104 that is associated with any button on the foreign remote control 110.

In the preferred embodiment, the present invention utilizes a standard VCR remote control to activate user interface (UI) functions of a digital still camera. However, it is to be understood by those of ordinary skill in the art that the principles of the present invention can be applied to other remote controls (e.g., the remote control for a digital video disc (DVD) player, a universal remote control, a remote control for a stereo system, etc.). Furthermore, although the principles of the remote control method and system of the present invention has been described in the context of controlling a digital still camera, it is to be appreciated that the present invention can be applied to controlling other types of image capture devices and systems (e.g., a digital video camera).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for enabling an image capture system to respond to at least one command transmitted by a foreign remote control that is associated with a first device, the method comprising:
   training the image capture system to respond to at least one command that is received from the foreign remote control, the training comprising: instructing a user to press a button on the foreign remote control for a predetermined function of the image capture system; the foreign remote control transmitting a command associated with the button; the image capture system receiving the command; and the image capture system associating the received command with the predetermined function of the image capture system; and
   employing the foreign remote control to access at least one function of the trained image capture system.

2. The method of claim 1 wherein the step of the image capture system receiving the command further comprises:
   polling a port for an incoming command;
   determining if a command has been captured;
   performing the polling when a command has not been captured; and
   associating the received command with the predetermined function of the image capture system when a bit stream has been captured.

3. The method of claim 2 wherein the command is in the form of a bit stream.

4. The method of claim 1 further comprising:
   determining whether there are more functions to process;
   instructing a user to press a button on the foreign remote control for a predetermined function of the image capture system when there are more functions to process; and
   exiting the training mode when there are no more functions to process.

5. The method of claim 1 wherein the step of the associating the received command with the predetermined function of the image capture system includes storing the association of the received command with the predetermined function of the image capture system in an association table.

6. The method of claim 1 wherein the image capture system includes a digital image capture device.

7. The method of claim 6 wherein the digital image capture device includes one of a digital camera and a digital video camera.

8. The method of claim 6 wherein the image capture system further includes a docking station for receiving the digital image capture device.

9. The method of claim 1 wherein the image capture system includes a docking station for receiving a digital image capture device; wherein the docking station includes at least one accessible function.

10. An image capture system comprising:
    a first function that is accessible by a user;
    a proxy-based remote control mechanism for receiving commands from a foreign remote control, for associating at least one received command with the first function of the image capture system, and for storing the association between the received command and the first function in an association table during a training mode;
    wherein the proxy-based remote control mechanism during operation receives commands from the foreign remote control, decodes the received commands by employing the association table, and allows the foreign remote control to access the function of the image capture system corresponding to the decoded command; and
    wherein the training mode comprises: instructing a user to press a button on the foreign remote control for a predetermined function of the image capture system; the foreign remote control transmitting a command associated with the button; the image capture system receiving the command; and the image capture system associating the received command with the predetermined function of the image capture system.

11. The image capture system of claim 10 wherein the proxy-based remote control mechanism includes:
    a command receiver for receiving commands from the foreign remote control;
    a command decoder for decoding the received commands by employing the association table; and
    a command training facility for enabling the foreign remote control to access a function of the image capture system that is associated with the decoded command.

12. The image capture system of claim 10 that includes a reminder mode; wherein the proxy-based remote control mechanism includes:
    a reminder mode module for generating a representation of a user interface function in response to receiving a command from the foreign remote control when the reminder mode is enabled;
    wherein the reminder mode module enables a user to determine a function of the image capture system that is associated with at least one function on the foreign remote control.

13. The image capture system of claim 10 wherein the image capture system includes a digital image capture device.

14. The image capture system of claim 13 wherein the digital image capture device includes one of a digital camera and a digital video camera.

15. The image capture system of claim 10 wherein the image capture system includes a docking station for receiving a digital image capture device.

* * * * *

UNITED STATES PATENT AND TRADEMARK OFFICE
CERTIFICATE OF CORRECTION

PATENT NO. : 7,068,306 B2 Page 1 of 1
APPLICATION NO. : 10/037759
DATED : June 27, 2006
INVENTOR(S) : Norman C. Pyle et al.

It is certified that error appears in the above-identified patent and that said Letters Patent is hereby corrected as shown below:

On the face page, in field (54), in column 1, in "Title", line 3, delete "CAMERA" and insert -- IMAGE CAPTURE DEVICE --, therefor.

In column 1, line 3, delete "CAMERA" and insert -- IMAGE CAPTURE DEVICE --, therefor.

In column 9, line 55, in Claim 4, after "comprising" delete "the".

Signed and Sealed this

Twelfth Day of May, 2009

JOHN DOLL
*Acting Director of the United States Patent and Trademark Office*